(12) United States Patent
Choi (10) Patent No.: US 6,629,359 B2
(45) Date of Patent: Oct. 7, 2003

(54) DEVICE FOR ASSEMBLING BASE AND MAIN BOARD ASSEMBLY FOR HARD DISK DRIVE

(75) Inventor: Byung-Gyou Choi, Kumi (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 10/166,695

(22) Filed: Jun. 12, 2002

(65) Prior Publication Data

US 2002/0148103 A1 Oct. 17, 2002

Related U.S. Application Data (62) Division of application No. 09/397,135, filed on Sep. 16, 1999, now Pat. No. 6,427,317.

(30) Foreign Application Priority Data

Sep. 19, 1998 (KR) .......................................... 1998-38883

(51) Int. Cl.[7] .............................................. H01R 19/00
(52) U.S. Cl. ................... 29/729; 29/603.03; 29/603.01; 29/737; 29/760; 360/97.1; 360/98.08; 360/98.07
(58) Field of Search ....................... 29/603.03, 603.01, 29/467, 729, 737, 760; 360/97.01, 97.02, 99.04, 98.07, 99.08

(56) References Cited

U.S. PATENT DOCUMENTS

| | | | |
|---|---|---|---|
| 4,669,053 A | | 5/1987 | Krenz |
| 5,025,335 A | | 6/1991 | Stefansky |
| 5,025,336 A | * | 6/1991 | Morehouse et al. ..... 360/97.02 |
| 5,113,297 A | * | 5/1992 | Yoshida ....................... 360/133 |
| 5,253,129 A | | 10/1993 | Blackborow et al. |
| 5,311,455 A | | 5/1994 | Ho |
| 5,379,514 A | * | 1/1995 | Okuda et al. .................. 29/833 |
| 5,404,636 A | | 4/1995 | Stefansky et al. |
| 5,420,733 A | | 5/1995 | Knighton et al. |
| 5,442,513 A | | 8/1995 | Lo |
| 5,454,080 A | | 9/1995 | Fasig et al. |
| 5,454,157 A | | 10/1995 | Ananth et al. |
| 5,546,250 A | * | 8/1996 | Diel ........................ 360/97.02 |
| 5,551,145 A | | 9/1996 | Jurgenson |
| 5,572,402 A | | 11/1996 | Jeong |
| 5,609,496 A | | 3/1997 | Kilmer et al. |
| 5,673,157 A | * | 9/1997 | Ycas et al. ............... 360/97.01 |
| 5,694,219 A | * | 12/1997 | Kim ........................... 356/615 |
| 5,757,582 A | | 5/1998 | White et al. |
| 5,765,275 A | * | 6/1998 | Obara ...................... 29/603.03 |
| 5,796,557 A | * | 8/1998 | Bagnell et al. ............. 360/105 |
| 5,822,184 A | | 10/1998 | Rabinovitz |
| 5,826,325 A | | 10/1998 | Price et al. |
| 5,881,454 A | | 3/1999 | Baxter et al. |
| 5,898,537 A | | 4/1999 | Oizumi et al. |
| 6,091,253 A | | 7/2000 | Huang |

* cited by examiner

Primary Examiner—A. Dexter Tugbang
Assistant Examiner—Tai Nguyen
(74) Attorney, Agent, or Firm—Robert E. Bushnell, Esq.

(57) ABSTRACT

Disclosed is a device for assembling a device including a base and a main board assembly in a hard disk drive including an actuator having a magnetic head; a base having a spindle motor mounted thereon, the spindle motor rotating at high speed a disk on which the magnetic head is suspended to conduct data writing and reading; and a main board assembly assembled to a lower surface of the base. The device comprises a guide section for establishing a vertical assembling position of the base and the main board assembly and for allowing the main board assembly to be capable of a sliding movement to a predetermined location on the base; a stopper section for stopping the sliding movement of the main board assembly on the base; and a locker for locking the main board assembly stopped by the stopper section to the base in a vertical direction.

27 Claims, 6 Drawing Sheets

DEVICE FOR ASSEMBLING BASE AND MAIN BOARD ASSEMBLY FOR HARD DISK DRIVE

CROSS-REFERENCE TO RELATED APPLICATIONS

This application is a divisional of applicant's Ser. No. 09/397,135 filed on Sep. 16, 1999 now U.S. Pat. No. 6,427,317, and assigned to the assignee of the present invention.

CLAIM OF PRIORITY

This application makes reference to, incorporates the same herein, and claims all benefits accruing under 35 U.S.C. §119 and §120 from an application entitled Device and Method for Assembling Base and Main Board Assembly earlier filed in the Korean Industrial Property Office on the day of Sep. 19, 1998, and there duly assigned Serial No. 38883/1998, a copy of which is annexed hereto.

BACKGROUND OF THE INVENTION

1. Technical Field

The present invention relates to a hard disk drive, and more particularly to a device and a method for assembling a base and a main board assembly together.

2. Related Art

Generally, hard disk drives are mainly used as an auxiliary recording data storage unit. Such hard disk drives will be steadily used even in the future by virtue of their useful functions. Current developments of the peripheral environment of computers result in intensive competition for technical developments of hard disk drives with a larger capacity and a higher processing speed.

A hard disk drive is a precise product composed of electronic units and mechanical units. In such a hard disk drive, electrical signal information is magnetized on a magnetic recording medium so that corresponding information is recorded on the magnetic recording medium. Magnetic signals recorded on the magnetic recording medium are read out in the form of electrical signal information.

Computer systems are information handling systems that are utilized by many individuals and businesses today. A computer system can be defined as a microcomputer that includes a central processing unit (CPU), a volatile memory, a non-volatile memory such as read only memory (ROM), a display monitor, a keyboard, a mouse or other input device such as a trackball, a floppy diskette drive, a compact disc-read only memory (CD-ROM) drive, a modem, a hard disk storage device, and a printer. A computer system's main board, which is a printed circuit board known as a motherboard, is used to electrically connect these components together. A computer system can be a desktop computer, a personal computer, a portable computer such as a notebook computer or palm-sized computer, or other type of computer.

A hard disk storage device can also be referred to as a hard disk drive containing a hard disk, wherein the hard disk is the actual storage medium. A platter is another term for a hard disk. The hard disk drive is an auxiliary memory unit of the computer system. The hard disk drive contains components enabling data to be received from the associated computer system and then written to the hard disk, and also enabling data to be read from the hard disk and then transmitted to the associated computer system. The hard disk drive includes a magnetic read/write head which flies above the surface of the hard disk while the hard disk is rotating.

The hard disk has a plurality of concentric tracks for storing data. Each track has a plurality of sectors. Some hard disk drives contain several hard disks, each hard disk being horizontally mounted on one shared vertical spindle-axis, so that the hard disks form a stack of hard disks. When a disk drive has a plurality of hard disks, with each disk having its own read/write head, every read/write head is aligned on a separate track of its associated hard disk. A head actuator locks all the heads together so that all heads are at the same position from the center of the disk along a given radius. The vertical stack of tracks formed by such an arrangement is referred to as a cylinder. The number of cylinders in a hard disk drive is the same as the number of tracks on a hard disk of that hard disk drive.

A primary function of the hard disk drive is to receive data from the associated computer system, write the data onto the hard disk without loss of the data, and then read and transmit the data to the computer system when necessary. Therefore, a manufacturer of the hard disk drive not only makes an effort to maximize data recording capacity, but also looks for various means to prevent data loss when writing and reading the data.

Hard disk drives typically include one or more magnetic disks defining a multiplicity of concentric data tracks. Each data track is divided into sectors with intersector gaps therebetween, and each sector is subdivided into a data sector and a servo sector. The data sectors are used for the storage of main data or user information. The servo sectors are used for the storage of control data such as automatic gain control (AGC) data, track addresses, and tracking servo patterns for use in position a head. Magnetic disk drives having high data density generally rely upon servo control systems for moving a selected transducer (head) from a departure track to a destination track location when data information is written or read from the disk.

I have found that a coupling of a magnetic head of a hard disk drive to a main board via a base can be extremely inconvenient due to the types of connectors and the number of connectors required. Efforts have been made to improve disk drives.

Exemplars of recent efforts in the art include U.S. Pat. No. 5,822,184 for MODULAR DISK DRIVE ASSEMBLY OPERATIVELY MOUNTABLE IN INDUSTRY STANDARD EXPANSION BAYS OF PERSONAL DESKTOP COMPUTERS issued to Rabinovitz; U.S. Pat. No. 5,757,582 for MINIATURE HARD DISK DRIVE SYSTEM issued to White et al.; U.S. Pat. No. 5,609,496 for AIRTIGHT CONNECTOR ASSEMBLY issued to Kilmer et al.; U.S. Pat. No. 5,572,402 for HARD DISK DRIVE MOUNTING ASSEMBLY FOR A COMPUTER issued to Jeong; U.S. Pat. No. 5,454,080 for REMOVABLE HARD DISK DRIVE SYSTEM WITH CIRCUIT FOR HOT INSERTION AND REMOVAL RESPONSIVE TO CONTACTS OF ZERO-INSERTION-FORCE CONNECTOR ON THE LATERAL SIDE OF THE DRIVE issued to Fasig et al.; U.S. Pat. No. 5,442,513 for HARD DISK DRIVE AND CASING SLIDABLY RECEIVED WITHIN FRAME HAVING DOUBLE-SWINGING DOOR AND LOCK issued to Lo; U.S. Pat. No. 5,311,455 for PORTABLE COMPUTER HAVING A HARD DISK DRIVE MOUNTED THEREIN issued to Ho; U.S. Pat. No. 5,253,129 for REMOVABLE AND TRANSPORTABLE HARD DISK SUBSYSTEM issued to Blackborow et al.; and U.S. Pat. No. 4,669,053 for PORTABLE PERSONAL COMPUTER issued to Krenz.

While these recent efforts provide advantages, I note that they fail to adequately provide a conveniently and efficiently improved device and method for assembling a base of a hard disk drive with a main board.

SUMMARY OF THE INVENTION

Accordingly, the present invention has been made in an effort to solve the problems occurring in the related art, and a primary object of the present invention is to provide a device and a method for assembling a base and a main board assembly in a hard disk drive in which a magnetic head is electrically connected to the main board assembly without using a 20 pin of the base and a 20 pin socket of the main board assembly.

Another object of the present invention is to provide a device and a method for assembling a base and a main board assembly, which are advantageous to miniaturization in the size of a hard disk drive.

Still another object of the present invention is to provide a device and a method for assembling a base and a main board assembly, which improve ease of assembly when viewed from a point of a worker.

In order to achieve the above objects and others, according to one aspect of the present invention, there is provided a device for assembling a base and a main board assembly in a hard disk drive including an actuator having a magnetic head; a base having a spindle motor mounted thereon, the spindle motor rotating at high speed a disk on which the magnetic head is suspended to conduct data writing and reading; and a main board assembly assembled to a lower surface of the base, the device comprising; a guide section for establishing a vertical assembling position of the base and the main board assembly and for allowing the main board assembly to be capable of a sliding movement to a predetermined location on the base; a stopper section for stopping the sliding movement of the main board assembly on the base; and a locker for locking the main board assembly stopped by the stopper section to the base in a vertical direction.

According to another aspect of the present invention, there is provided a method for assembling a base and a main board assembly in a hard disk drive including an actuator having a magnetic head, the base having a spindle motor mounted thereon, the spindle motor rotating at high speed a disk on which the magnetic head is suspended to conduct data writing and reading, the base possessing at least one position determining projection and at least one stopper projection, and a main board assembly assembled to a lower surface of the base and having an inserting hole which corresponds to the position determining projection, the method comprising the steps of: establishing a vertical assembling position of the base and the main board assembly by inserting the position determining projection of the base into the inserting hole of the main board assembly; sliding the main board assembly on the base to bring one end of the main board assembly into contact with the stopper projection of the base; and locking the main board assembly to the base using a plurality of screws.

To achieve these and other objects in accordance with the principles of the present invention, as embodied and broadly described, the present invention provides an apparatus, comprising: an assembly unit coupling a board unit to a base of a hard disk drive, said base having a motor mounted thereon to rotate a platter adjacent to a magnetic read/write head of said hard disk drive, said assembly unit further comprising: a guide unit including a projection formed on a first surface of said base to project away from said first surface, guiding said board unit toward said first surface, and guiding said board unit along said first surface up to a predetermined location on said first surface of said base; a stopping unit preventing said board unit from moving beyond said predetermined location when said guide unit is guiding said board unit along said first surface toward said predetermined location; and a locking unit securing said board unit to said base when said board unit is at said predetermined location on said first surface of said base.

To achieve these and other objects in accordance with the principles of the present invention, as embodied and broadly described, the present invention provides a method, comprising: coupling a board unit to a base of a hard disk drive, said base having a motor mounted thereon to rotate a platter adjacent to a magnetic read/write head of said hard disk drive, said base having at least one position determining projection and at least one stopper projection, said board unit forming at least one orifice corresponding to said position determining projection, said coupling further comprising: inserting said at least one position determining projection of said base into the at least one orifice of said board unit; sliding said board unit along said base to bring said board unit into contact with said at least one stopper projection of said base; and locking said board unit to said base.

To achieve these and other objects in accordance with the principles of the present invention, as embodied and broadly described, the present invention provides an assembly apparatus assembling a board unit to a base of a hard disk drive, said apparatus comprising: a hard disk drive having a base and further comprising: an actuator having a magnetic head, said magnetic head conducting data writing and reading operations; and a spindle motor mounted to said base of said hard disk drive, said spindle motor rotating a platter beneath said magnetic head; a guide unit including a projection formed on a first surface of said base to project away from said first surface, guiding said board unit toward said first surface in a first direction perpendicular to said first surface, and guiding said board unit along said first surface in a second direction parallel to said first surface up to a predetermined location on said first surface of said base; a stopping unit preventing said board unit from moving in said second direction beyond said predetermined location when said guide unit is guiding said board unit along said first surface toward said predetermined location; and a locking unit securing said board unit to said base when said board unit is at said predetermined location on said first surface of said base.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DETAILED DESCRIPTION OF THE PREFERRED EMBODIMENT

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

A hard disk drive can be connected to a computer system via a main board assembly unit. In other words, a base of a hard disk drive can first be connected to a main board assembly unit, and then the main board assembly unit can be connected to a main board of a computer system. Thus, the hard disk drive can be operationally connected to a central processing unit of a computer system to thereby establish a path for communication between the hard disk drive and the central processing unit of the computer system.

Figure 1:
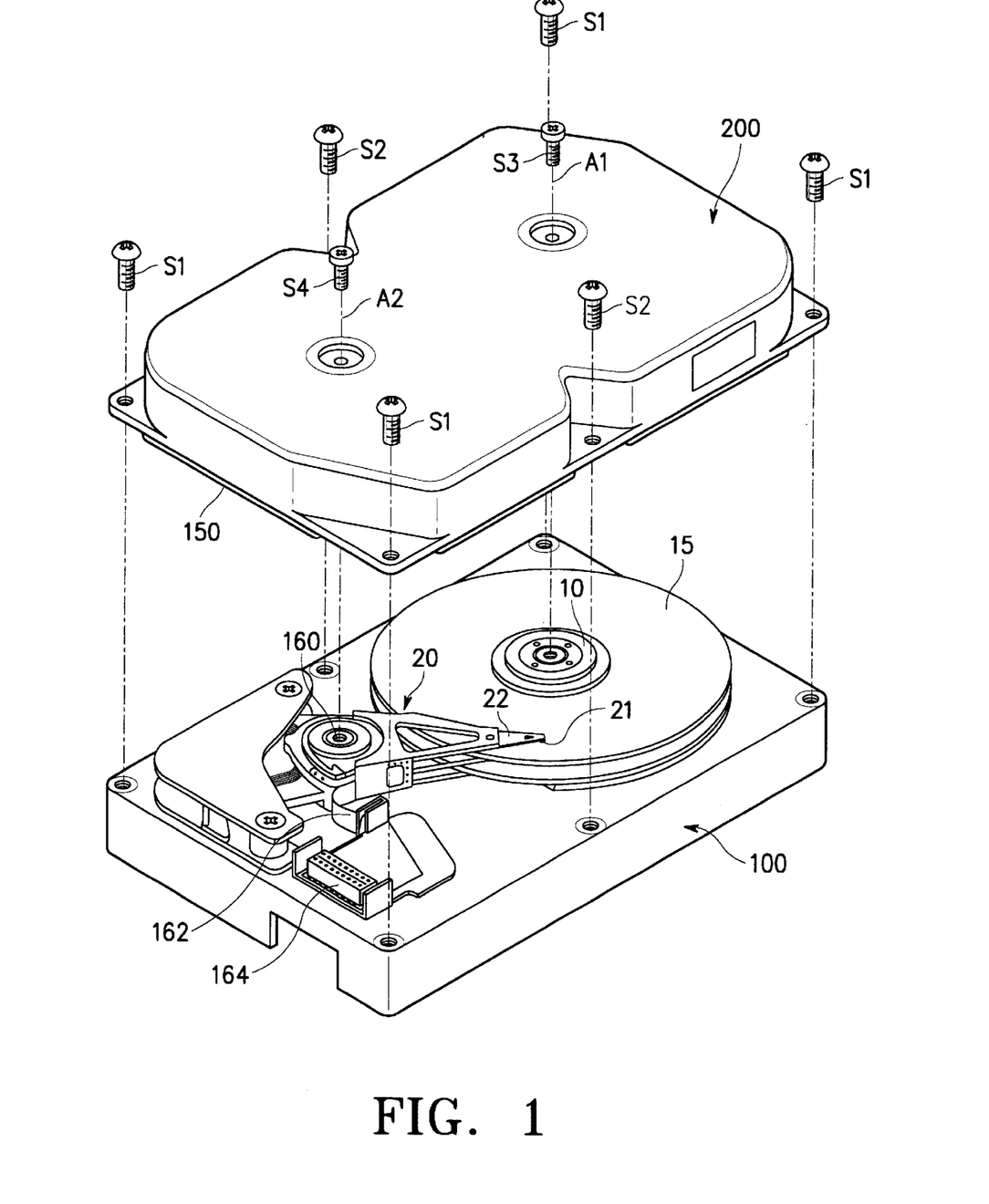
FIG. 1 is an exploded perspective view of a hard disk drive.

Turn now to FIG. 1, which shows an exploded perspective view of a hard disk drive. As shown in FIG. 1, a hard disk drive includes a disk 15 which is a recording data storage medium for recording and storing data, a spindle motor 10 for rotating the disk 15 at high speed, and a magnetic head 21 suspended from the disk 15 by an air bearing created by the disk 15 rotating at high speed and adapted to conduct data writing and reading while moving in radial directions. A plurality of screws S1, S2, S3, and S4 (shown in FIG. 1) are used to secure the cover 200 to the base 100.

Figure 2:
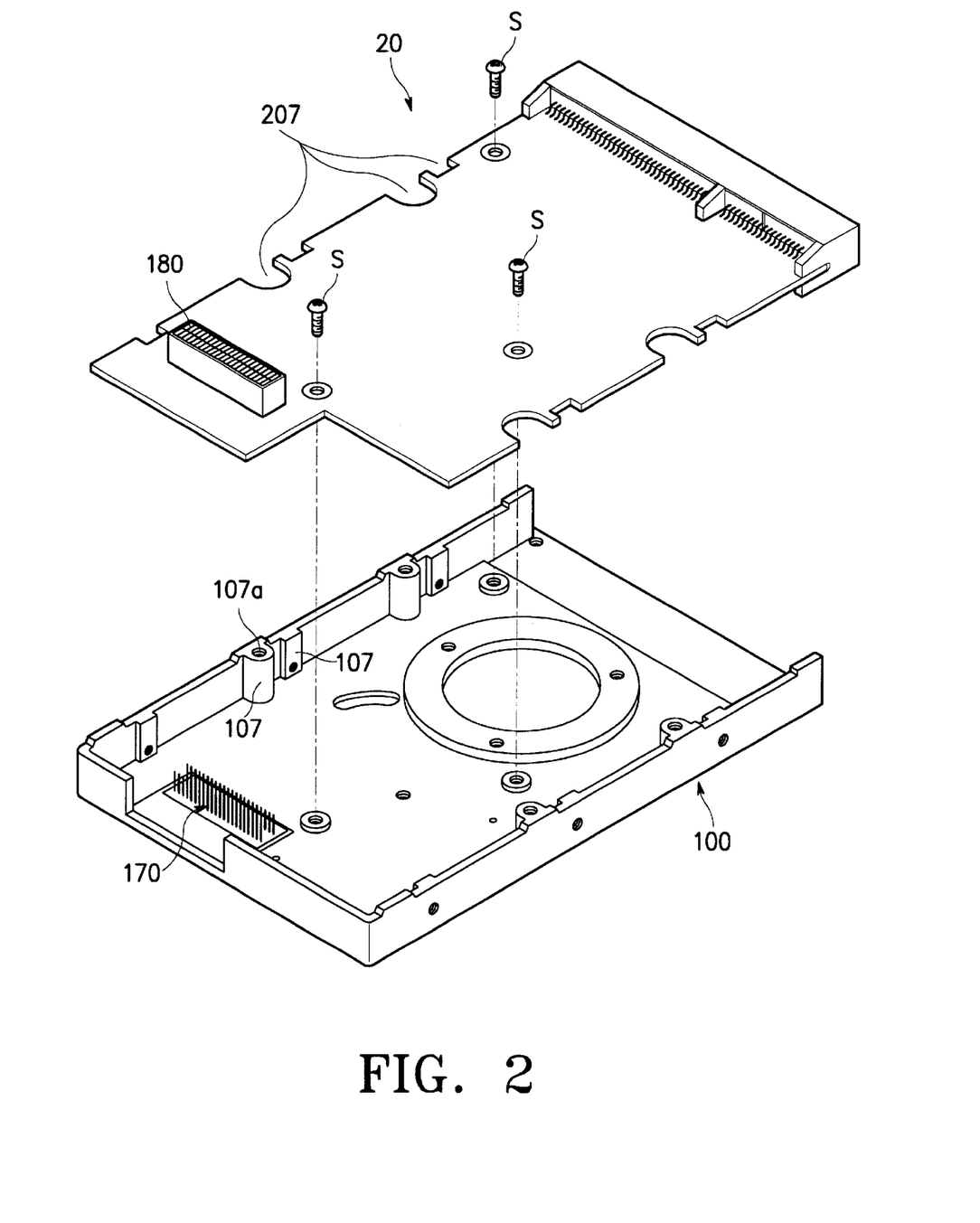
FIG. 2 is an exploded perspective view representing an assembling pattern between a base and a main board assembly.

With continued reference to FIG. 1, turn now to FIG. 2, which shows an exploded perspective view representing an assembling pattern between a base and a main board assembly. In FIGS. 1 and 2, the hard disk drive also includes an actuator 12 adapted to move the magnetic head 21 to a desired position on the disk 15 while pivoting about a pivot shaft 160, a base 100 on which the above elements are mounted, a cover 200 coupled to the base 100 and adapted to protect the above elements while providing a seal for the hard disk drive, and a main board assembly 20 assembled to a lower surface of the base 100 for controlling the above elements.

At this time, in order to electrically connect a signal of the magnetic head 21 secured to a free end of a suspension 22, to the main board assembly 20, a wire extending from the magnetic head 21 is connected to a flexible printed circuit 162 which is in turn connected to a pin socket 164. A first 20 pin socket 164 is connected to a 20 pin 170 shown in FIG. 2 which is in turn connected to a second 20 pin socket 180 of the main board assembly 20. Accordingly, the magnetic head 21 is electrically connected to the main board assembly 20.

As a result, an electrical connection path between the magnetic head 21 and the main board assembly 20 includes the magnetic head 21, the flexible printed circuit 162, the pin socket 164, the 20 pin 170, the 20 pin socket 180, and the main board assembly 20.

Figure 3:
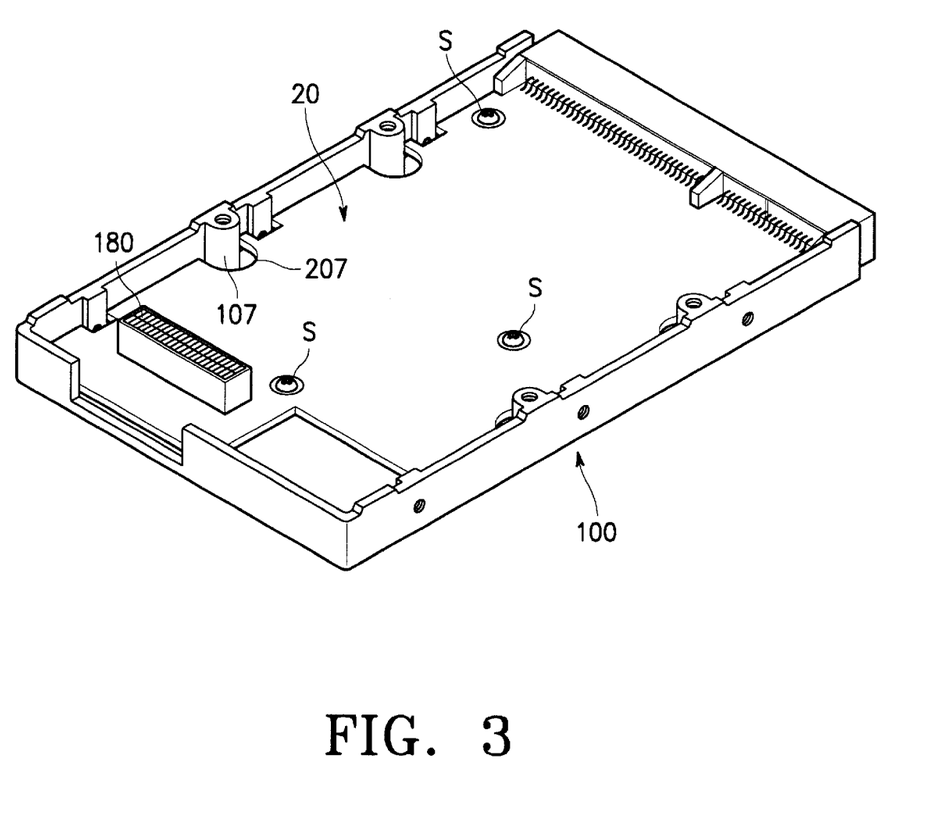
FIG. 3 is a perspective view illustrating the base and the main board assembly of FIG. 2, which are assembled to each other.

Turn now to FIG. 3, which shows a perspective view illustrating the base and the main board assembly of FIG. 2, which are assembled to each other. In the hard disk drive, as shown in FIGS. 2 and 3, in the course of assembling the main board assembly 20 to the base 100, when it is required to determine an assembling position where the main board assembly 20 is assembled to the base 100, the 20 pin 170 mounted to the base 100 is first inserted into the 20 pin socket 180 mounted to the main board assembly 20, and thereafter, the main board assembly 20 is locked to the base 100 using a plurality of screws S shown in FIGS. 2 and 3.

At this time, for ensuring that the main board assembly 20 is precisely arranged on the base 100, a plurality of reinforcing portions 107, each of which may have a locking hole 107a, are formed in the base 100, and a plurality of grooves 207 which correspond to the plurality of reinforcing portions 107, respectively, are defined in the main board assembly 20. As described above, the reinforcing portions 107 and the grooves 207 function to secure positioning of the main board assembly 20 with the base 100.

However, the hard disk drive, constructed as mentioned above, suffers from defects in that the 20 pin 170 and two 20 pin sockets 164 and 180 must be necessarily provided to precisely position the main board assembly 20 on the base 100. In other words, the 20 pin 170 and the two 20 pin sockets 164 and 180 not only serve as electrical connectors but also function to determine the assembling position where the main board assembly 20 is assembled to the base 100. Hence, in the hard disk drive of FIGS. 1 to 3, ease of assembly is decreased and size is enlarged.

Accordingly, in a hard disk drive in which a 20 pin and a 20 pin socket are not used to connect a magnetic head to a main board assembly, it is necessary to determine an assembling position in a separate way.

Reference will now be made in greater detail to the preferred embodiments of the present invention. In the following description of the present invention, a detailed description of known functions and configurations incorporated herein will be omitted when it may make the subject matter of the present invention rather unclear.

Generally, a hard disk drive includes a base, a cover locked to the base and a gasket intervened between the base and the cover to perform a sealing function. At this time, a spindle motor for rotating a disk at high speed and an actuator having a magnetic head are mounted on the base.

Figure 4:
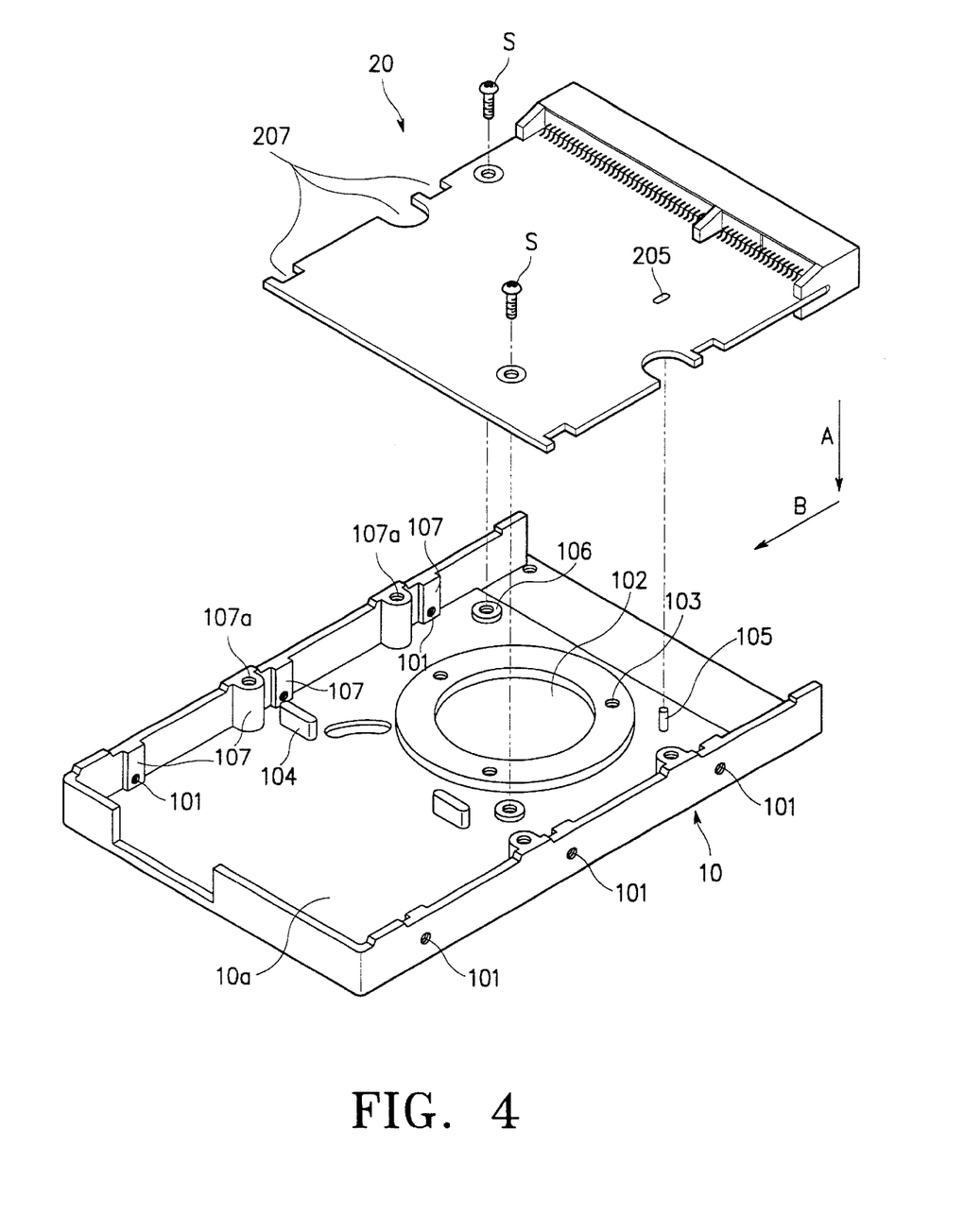
FIG. 4 is an exploded perspective view representing an assembling pattern between a base and a main board assembly, in accordance with the principles of the present invention.

Turn now to FIG. 4, which shows an exploded perspective view representing an assembling pattern between a base and a main board assembly, in accordance with the principles of the present invention. In FIG. 4, a lower surface 10a of a base 10 is denoted in a perspective view. In a hard disk drive, a main board assembly 20 is generally secured to the lower surface 10a of the base 10.

In the hard disk drive according to the present invention shown in FIG. 4, a magnetic head is electrically connected to the main board assembly 20 by using a flexible printed circuit (not shown) instead of using the 20 pin 170 and two 20 pin sockets 164 and 180 shown in FIGS. 1 to 3.

As shown in FIG. 4, the base 10 of the present invention is formed at desired points on its side walls with a plurality of mounting holes 101, respectively, at which it can be mounted to a body using a bracket. A circular opening 102 through which a spindle motor passes for being mounted to the base 10 is defined at a center portion of the base 10. Adjacent the circular opening 102, three threaded holes 103 at which the spindle motor is locked to the base 10 are formed in the base 10.

A plurality of locking bosses 106, in each of which a locking hole 106a is defined, are projectedly formed on the lower surface 10a of the base 10. In other words, the plurality of locking bosses 106 are formed to project from the lower surface 10a of the base 10. A plurality of screws S are to be locked to the plurality of locking holes 106a. Also, a plurality of reinforcing portions 107 each of which may have a locking hole 107a, are formed at the side walls of the base 10. A plurality of grooves 207 which correspond to some of the reinforcing portions 107, respectively, are defined in the main board assembly 20. See FIGS. 4 and 6. This assists in determining an assembling position where the main board assembly 20 is assembled to the base 10.

In one process of assembling the hard disk drive, when the main board assembly 20 is assembled to the base 10, a robot assembles the main board assembly 20 to the base 10 in a direction of A (for example a vertical direction), then slides the main board assembly 20 on the base 10 in a direction of B (for example a horizontal direction), and thereafter locks the base 10 and the main board assembly 20 together using a plurality of screws S.

At this time, in order to precisely determine the assembling position when the main board assembly 20 is assembled to the base 10 in the direction of A, a position-determining projection 105 is formed to project from a desired location on the lower surface 10a of the base 10, and an inserting hole 205 which corresponds to the position-determining projection 105 is defined at a selected location in the main board assembly 20. It can be seen from FIG. 4 that the position-determining projection 105 projects upward and the inserting hole 205 has a shape of a slot. By this construction, when the main board assembly 20 is assembled to the base 10, the position-determining projection 105 is inserted into the inserting hole 205.

After the main board assembly 20 is assembled to the base 10 in the direction of A, the main board assembly 20 can be slid on the base 10 in the direction of B due to the fact that the inserting hole 205 thereof has a shape of a slot. Thereafter, the sliding movement of the main board assembly 20 is stopped by two stopper projections 104 which are formed at predetermined locations on the base 10. When one end of the main board assembly 20 is brought into contact with the stopper projections 104, the main board assembly 20 is assembled to the base 10 by vertically locking a plurality of screws S into the locking holes 106a, respectively.

As a result, in the device for assembling the main board assembly 20 and the base 10, an entire assembling procedure for assembling the main board assembly 20 and the base 10 together includes a first process of assembling the main board assembly 20 to the base 10 in the vertical direction, a second process of sliding the main board assembly 20 on the base 10 to bring one end of the main board assembly 20 into contact with the stopper projections 104 formed on the base 10, and a third process of locking the main board assembly 20 to the base 10 using the plurality of screws S.

The assembling position of the main board assembly 20 and the base 10 is determined by the insertion of the position-determining projection 105 into the inserting hole 205. The main board assembly 20 can be slid on the base 10 due to the shape of the inserting hole 205, to be brought into contact with the stopper projections 104. By locking the plurality of screws S into the plurality of locking holes 106a, respectively, the assembling operation of the main board assembly 20 to the base 10 is completed.

Figure 5A:
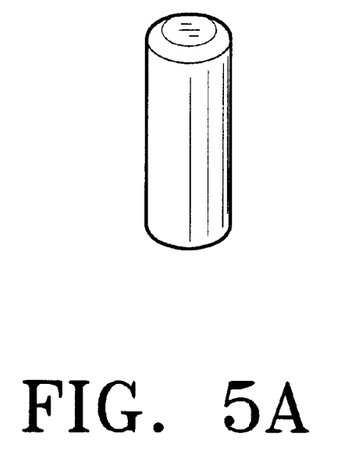
FIG. 5A is a perspective view depicting an independent appearance of a position-determining projection formed on a lower surface of a base, according to the principles of the present invention.

Turn now to FIG. 5A, which shows a perspective view depicting an independent appearance of a position-determining projection formed on a lower surface of a base, according to the principles of the present invention. Also turn now to FIG. 5B, which shows a perspective view depicting an independent appearance of a stopper projection formed on the lower surface of the base, according to the principles of the present invention.

Means for precisely determining the assembling position when the main board assembly 20 is assembled to the base 10, will be described in detail with reference to FIGS. 5A and 5B.

Referring to FIG. 5A, there is illustrated an independent appearance of the position-determining projection 105 for establishing the precise assembling position when the main board assembly 20 is assembled to the base 10. The position-determining projection 105 projects upward as described above and has a circular cross-section. At this time, although it was explained that the position-determining projection 105 has a circular cross-section, it is to be readily understood that the position-determining projection 105 can have another cross-section which is not circular, such as an oval cross-section or a rectangular cross-section. In FIG. 5B, a Y axis represents a direction in which the inserting hole 205 extends, and a Z axis represents a direction in which the position-determining projection 105 extends.

Figure 5B:
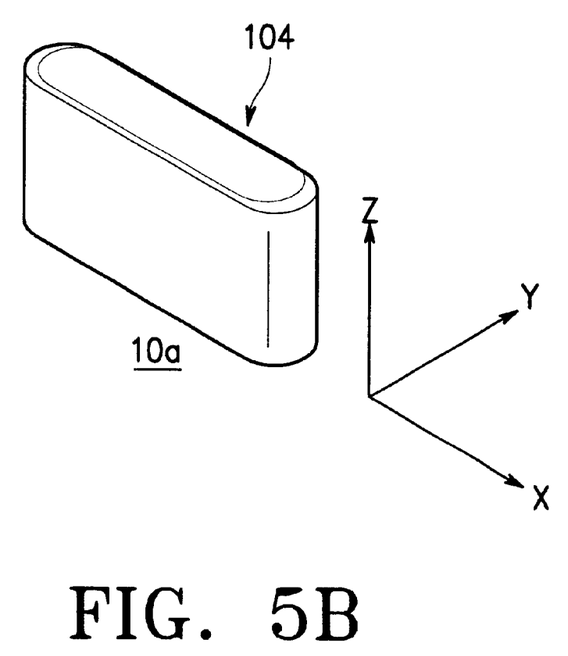
FIG. 5B is a perspective view depicting an independent appearance of a stopper projection formed on the lower surface of the base, according to the principles of the present invention.

Referring to FIG. 5B, there is illustrated an independent appearance of the stopper projection 104 for establishing locking positions in which the main board assembly 20 is locked to the base 10 by the plurality of screws S after the main board assembly 20 is precisely positioned on the base 10 due to the fact that the position-determining projection 105 is inserted into the inserting hole 205.

The stopper projection 104 projects upward and extends along an X axis. Of course, it is to be readily understood that the stopper projection 104 can have various cross-sections or shapes as long as it extends in the direction of the X axis.

Figure 6:
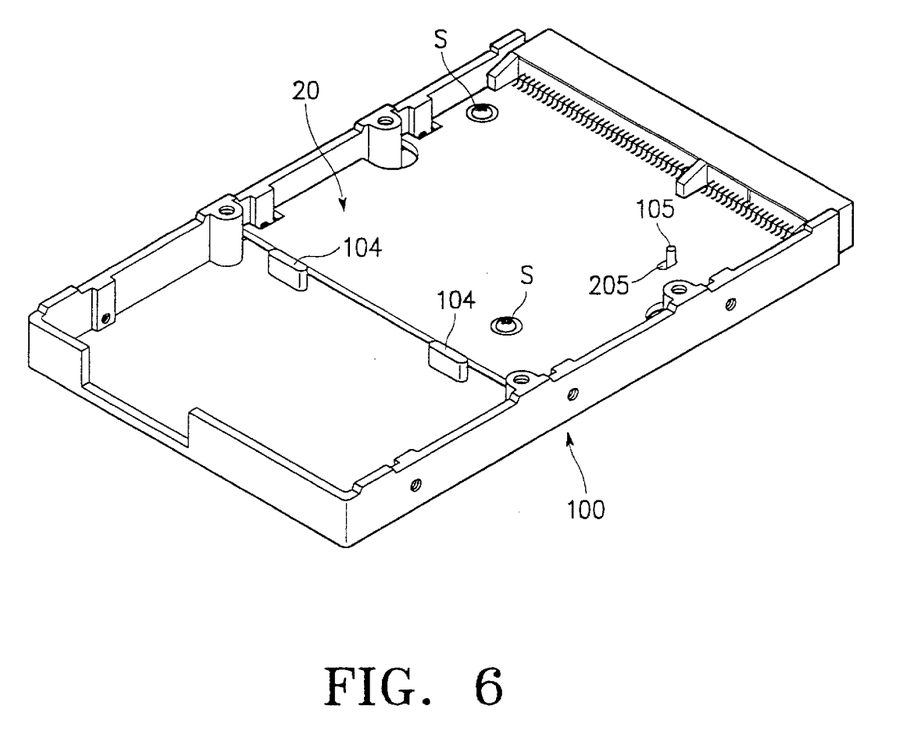
FIG. 6 is a perspective view illustrating the base and the main board assembly of FIG. 4, which are assembled to each other, in accordance with the principles of the present invention.

Turn now to FIG. 6, which shows a perspective view illustrating the base and the main board assembly of FIG. 4, which are assembled to each other, in accordance with the principles of the present invention. As can be seen from FIG. 6, the main board assembly 20 is assembled to the base 10 at the desired location by the presence of the position-determining projection 105 and is slid on the base 10 to be brought into contact with the two stopper projections 104. Then, the main board assembly 20 is locked to the base 10 by the plurality of screws S to be securely mounted thereto at the precise predetermined locations.

As described above, according to the present invention, advantages are provided in that in a hard disk drive in which a magnetic head is electrically connected to a main board assembly by using a flexible printed circuit instead of using a 20 pin of a base and 20 pin sockets of the main board, the accurate position of the main board assembly can be conveniently taken when the main board assembly 20 is assembled to the base 20. Moreover, the present invention provides advantages in that the hard disk drive, especially, the main board assembly can be effectively miniaturized in size.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. An apparatus, comprising:
   an assembly unit coupling a board unit to a base of a hard disk drive, said base having a motor mounted thereon to rotate a platter adjacent to a magnetic read/write head of said hard disk drive, said assembly unit further comprising:
   a guide unit including a projection formed on a first surface of said base to project away from said first surface, guiding said board unit toward said first surface, and guiding said board unit along said first surface up to a predetermined location on said first surface of said base;
   a stopping unit preventing said board unit from moving beyond said predetermined location when said guide unit is guiding said board unit along said first surface toward said predetermined location; and
   a locking unit securing said board unit to said base when said board unit is at said predetermined location on said first surface of said base.

2. The apparatus of claim 1, said guide unit guiding said board unit toward said first surface in a first direction perpendicular to said first surface.

3. The apparatus of claim 2, said guide unit guiding said board unit along said first surface in a second direction parallel to said first surface.

4. The apparatus of claim 3, said guide unit further comprising an orifice formed by said board unit.

5. The apparatus of claim 4, said guide unit performing said guiding by cooperatively engaging said projection on said first surface of said base with the orifice formed by said board unit.

6. The apparatus of claim 5, said locking unit preventing said board unit from moving away from said first surface and preventing said board unit from moving along said first surface.

7. The apparatus of claim 6, the orifice formed by said board unit having a shape of a slot.

8. The apparatus of claim 7, said stopping unit further comprising at least one projection being formed on said first surface of said base and projecting from said first surface at said predetermined location.

9. An assembly apparatus, said apparatus comprising:
   a hard disk drive having a base and further comprising:
      an actuator having a magnetic head, said magnetic head conducting data writing and reading operations; and
      a spindle motor mounted to said base of said hard disk drive, said spindle motor rotating a platter beneath said magnetic head;
   a guide unit including a projection formed on a first surface of said base to project away from said first surface, guiding said board unit toward said first surface in a first direction perpendicular to said first surface, and guiding said board unit along said first surface in a second direction parallel to said first surface up to a predetermined location on said first surface of said base;
   a stopping unit preventing said board unit from moving in said second direction beyond said predetermined location when said guide unit is guiding said board unit along said first surface toward said predetermined location; and
   a locking unit securing said board unit to said base when said board unit is at said predetermined location on said first surface of said base.

10. The apparatus of claim 9, said guide unit further comprising an orifice formed by said board unit.

11. The apparatus of claim 10, the orifice formed by said board unit having a shape of a slot having a first dimension larger than a second dimension, said first dimension being measured in said second direction, said second dimension being measured in a third direction, said third direction being perpendicular to said first and second directions.

12. The apparatus of claim 11, said projection of said guide unit corresponding to a peg being formed on said first surface of said base, said peg being received by the slot-shaped orifice.

13. The apparatus of claim 9, said guide unit performing said guiding by cooperatively engaging said projection on said first surface of said base with an orifice formed by said board unit.

14. The apparatus of claim 9, said locking unit preventing said board unit from moving away from said first surface and preventing said board unit from moving along said first surface.

15. The apparatus of claim 9, said stopping unit further comprising at least one projection being formed on said first surface of said base and projecting from said first surface at said predetermined location.

16. An apparatus, comprising:
   an assembly unit coupling a board unit to a base of a hard disk drive, said board unit having an orifice, said base having a motor mounted thereon to rotate a platter adjacent to a magnetic read/write head of said hard disk drive, said assembly unit further comprising:
   a guide unit including a projection formed on a first surface of said base to project away from said first surface, said guide unit guiding said coupling of said board unit and base when said board unit is moved toward said first surface of said base, said guide unit directing said coupling of said board unit and said base when said board unit is sliding along said first surface up to a predetermined location on said first surface of said base, said guiding of said coupling including inserting said projection into the orifice of said board unit;
   a stopping unit preventing said board unit from moving beyond said predetermined location when said guide unit is guiding said board unit along said first surface toward said predetermined location; and
   a locking unit locking said board unit to said base when said board unit is at said predetermined location on said first surface of said base.

17. The apparatus of claim 16, the orifice having a shape of a slot.

18. An apparatus, comprising:
   a base of a hard disk drive, said base having a surface with at least one position determining projection and at least one stopper projection; and
   a board unit being coupled to said base, said board unit having a surface forming at least one orifice, said at least one position determining projection of said base being inserted into the at least one orifice of said board unit when said board unit is moved in a first direction with the surface of said base facing toward the surface of said board unit, said board unit being moved in a second direction to bring said board unit into contact with said at least one stopper projection of said base, the moving of said board unit in the second direction being performed with the surface of said board unit positioned to face toward the surface of said base, the second direction being perpendicular to the first direction.

19. The apparatus of claim 18, the at least one orifice having a shape of a slot.

20. An apparatus, comprising:

a first unit having at least one guiding unit; and a second unit having at least one positioning unit and at least one stopping unit, said at least one positioning unit being engaged with said at least one guiding unit when said first unit is moved in a first direction toward said second unit, said first unit being moved in a second direction to bring said first unit into contact with said at least one stopping unit, the first direction being substantially perpendicular to the second direction, said first unit corresponding to a board of a computer system.

21. An apparatus, comprising:

a first unit having at least one guiding unit; and a second unit having at least one positioning unit and at least one stopping unit, said at least one positioning unit being engaged with said at least one guiding unit when said first unit is moved in a first direction toward said second unit, said first unit being moved in a second direction to bring said first unit into contact with said at least one stopping unit, the first direction being substantially perpendicular to the second direction, said first unit corresponding to a base of a hard disk drive, said second unit corresponding to a board unit.

22. The apparatus of claim 21, said second unit having a motor mounted thereon to rotate a platter adjacent to a magnetic read-write head of said hard disk drive.

23. The apparatus of claim 20, said at least one stopping unit corresponding to a projection.

24. The apparatus of claim 23, said projection being fixedly attached to said second unit.

25. The apparatus of claim 20, said moving of said first unit in the second direction to bring said first unit into contact with said at least one stopping unit being performed while said at least one positioning unit engages said at least one guiding unit.

26. The apparatus of claim 20, said at least one guiding unit corresponding to an orifice formed by said first unit.

27. An apparatus, comprising:

a first unit having at least one guiding unit; and a second unit having at least one positioning unit and at least one stopping unit, said at least one positioning unit being engaged with said at least one guiding unit when said first unit is moved in a first direction toward said second unit, said first unit being moved in a second direction to bring said first unit into contact with said at least one stopping unit, the first direction being substantially perpendicular to the second direction, said at least one guiding unit corresponding to an orifice formed by said first unit, said at least one positioning unit being engaged with said at least one guiding unit when said at least one positioning unit is inserted into said at least one guiding unit.

* * * * *